United States Patent
Bruno et al.

(10) Patent No.: US 12,265,554 B2
(45) Date of Patent: Apr. 1, 2025

(54) SYSTEM AND METHOD FOR DISTRIBUTION OF DATA IN EDGE SYSTEMS

(71) Applicant: Dell Products L.P., Round Rock, TX (US)

(72) Inventors: Eric Joseph Bruno, Shirley, NY (US); Ana Smith, Chicago, IL (US); Mahesh Babu Ramaiah, Bangalore (IN); Bradley K. Goodman, Nashua, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/326,377

(22) Filed: May 31, 2023

(65) Prior Publication Data

US 2024/0403327 A1 Dec. 5, 2024

(51) Int. Cl.
*G06F 16/28* (2019.01)
*G06F 16/25* (2019.01)

(52) U.S. Cl.
CPC .......... *G06F 16/285* (2019.01); *G06F 16/258* (2019.01)

(58) Field of Classification Search
CPC .............................. G06F 16/285; G06F 16/258
See application file for complete search history.

(56) References Cited

U.S. PATENT DOCUMENTS

| | | | |
|---|---|---|---|
| 8,478,843 B1 * | 7/2013 | Ortlieb .................. | H04L 67/568 709/219 |
| 9,959,334 B1 * | 5/2018 | Bar-Zeev .......... | G06F 16/24568 |
| 10,437,825 B2 * | 10/2019 | Goodwin ............. | G06F 16/258 |
| 11,095,533 B1 * | 8/2021 | Hermoni .............. | H04L 43/067 |
| 11,153,163 B1 * | 10/2021 | Singhal ................ | G06F 11/004 |
| 11,405,361 B1 * | 8/2022 | Saalfeld .............. | H04L 63/0272 |
| 2004/0202123 A1 * | 10/2004 | Yoon ..................... | H04W 72/20 370/329 |
| 2011/0035187 A1 * | 2/2011 | Dejori ................. | G06F 9/44526 702/187 |
| 2012/0099672 A1 * | 4/2012 | Wan ..................... | H04L 65/762 375/295 |
| 2014/0259109 A1 * | 9/2014 | Houston ................ | H04L 63/08 726/3 |
| 2017/0272552 A1 * | 9/2017 | Zhou ...................... | H04L 67/01 |
| 2019/0014048 A1 * | 1/2019 | Krishna Singuru ....... | H04L 41/5041 |
| 2021/0026864 A1 * | 1/2021 | Kamiguchi ............. | H04L 67/34 |
| 2021/0241926 A1 * | 8/2021 | Chor ...................... | H04W 4/70 |
| 2022/0179733 A1 * | 6/2022 | Buch ...................... | G06F 3/0659 |
| 2022/0232423 A1 * | 7/2022 | Thyagaturu ........... | H04W 28/10 |
| 2023/0256334 A1 * | 8/2023 | Kurabayashi ......... | A63F 13/822 463/42 |

(Continued)

*Primary Examiner* — Etienne P Leroux
(74) *Attorney, Agent, or Firm* — WOMBLE BOND DICKINSON (US) LLP (57) ABSTRACT

Methods and systems for managing distribution of data are disclosed. The data may be distributed by edge systems to processing systems. The data may be distributed using a data pipeline. The data pipeline may include functionality to process data using different modalities depending on the type of data and operable connectivity between the edge systems and processing systems. By modifying the manner in which the data is processed, limitations in operable connectivity may be managed and a broader array of different types of data may be more efficiently distributed.

20 Claims, 7 Drawing Sheets

(56) References Cited

U.S. PATENT DOCUMENTS

| | | | |
|---|---|---|---|
| 2023/0353580 A1* | 11/2023 | Chapman | H04L 63/1416 |
| 2023/0368887 A1* | 11/2023 | Roh | G16H 40/67 |
| 2024/0095101 A1* | 3/2024 | Patro | G06F 11/3006 |
| 2024/0147342 A1* | 5/2024 | Zhu | H04W 24/08 |
| 2024/0259397 A1* | 8/2024 | Li | G06F 18/2415 |

* cited by examiner

SYSTEM AND METHOD FOR DISTRIBUTION OF DATA IN EDGE SYSTEMS

FIELD

Embodiments disclosed herein relate generally to data distribution. More particularly, embodiments disclosed herein relate to systems and methods for management of distribution of data in edge systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing distribution of different types of data. The data may be used to provide various computer implemented services, and may be collected from edge systems.

To facilitate collection of the data from the edge systems, the system may include a data pipeline that adapts to changing conditions and types of data to be distributed. The data pipeline may analyze obtained data to identify how to process the data. The data may be analyzed based on various criteria including, for example, the type of the data, the quantity of the data, etc.

Depending on the analysis and desires of consumers of the data, the data may be marked for immediate streaming to processing systems, or staged for future transactions. If streamed, the data may be immediately provided to processing systems such that the data may be immediately used (e.g., for management purposes).

In contrast, if staged, the data may be temporarily stored in the edge systems prior to distribution. Once staged, the staged data may be used to service queued requests for the data and newly received requests for the data.

To service such requests, transactions may be initiated. During a transaction, the requested data may be divided into portions and individually sent to processing systems. The data may be divided based on criteria that improves the efficiency of use of resources such as communication bandwidth. For example, the size of each portions may be set to reduce overhead (e.g., by filling full frames or other types of data units of communication systems over which the data is transmitted).

To manage transactions, correlation identifiers may be established and transmitted along with the portions of the data. The correlation identifiers may be used to identify relationships between various portions of data received by a processing system, and confirm when a transaction is complete.

Once the data is received by a processing system, the data may be used to directly and/or indirectly service requests. For example, the data may be provided directly to the data consumers, and may be used to generate derived data such as graphical representations reflecting an operating state of the edge system. An administrator or other person may use the graphical representations of the data to select how to manage (e.g., modify the operation) of the edge system. In this manner, the data may be used to both manage the operation of the edge system as well as provide other types of computer implemented services.

In an embodiment, a method for managing distributed processing of data is provided. The method may include obtaining the data from a data source; preparing the data for edge side processing to obtain prepared data; classifying the prepared data to obtain a data classification; selecting an edge side processing method based on the data classification; and performing the selected edge side processing method to provide access to the prepared data to at least one data consumer, and a secure connection being used during the selected edge side processing method to distribute the prepared data.

Preparing the data may include at least one action selected from a group of actions consisting of: filtering the data using a filtering criteria; formatting the data based on a formatting template; and aggregating the data with other data relevant to the at least one data consumer.

Classifying the prepared data may include identifying a type of the data; identifying a criticality of the data; identifying a quantity of the data; and using the type, the criticality, and the quantity to classify the prepared data.

The edge side processing method may be selected from a group of edge side processing methods consisting of: immediate forwarding; and staging for future forwarding.

In an instance of the selecting where the edge side processing method comprises the immediate forwarding, performing the selected edge side processing method may include streaming the prepared data to a processing system associated with the at least one data consumer.

In an instance of the selecting where the edge side processing method comprises the staging for future forwarding, performing the selected edge side processing method may include temporarily storing the prepared data in an edge system based on a retention policy for the data.

In the instance of the selecting where the edge side processing method comprises the staging for future forwarding, performing the selected edge side processing method may further include after temporarily storing the prepared data: obtaining a request from the processing system for at least a portion of the prepared data; based on the request: initiating a transaction for the at least the portion of the prepared data; and establishing a correlation identifier for the transaction usable by an edge system hosting the prepared data and the processing system.

In the instance of the selecting where the edge side processing method includes the staging for future forwarding, performing the selected edge side processing method may also include processing the transaction to provide the at least the portion of the prepared data to the at least one data consumer; and cooperatively monitoring the processing of the transaction to establish a shared understanding of a state of the transaction with the processing system.

Processing the transaction may include dividing the at least the portion of the prepared data based on a criteria to obtain data portions; and providing the data portions to the processing system along with the correlation identifier to facilitate the cooperative monitoring of the processing of the transaction.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Figure 1:
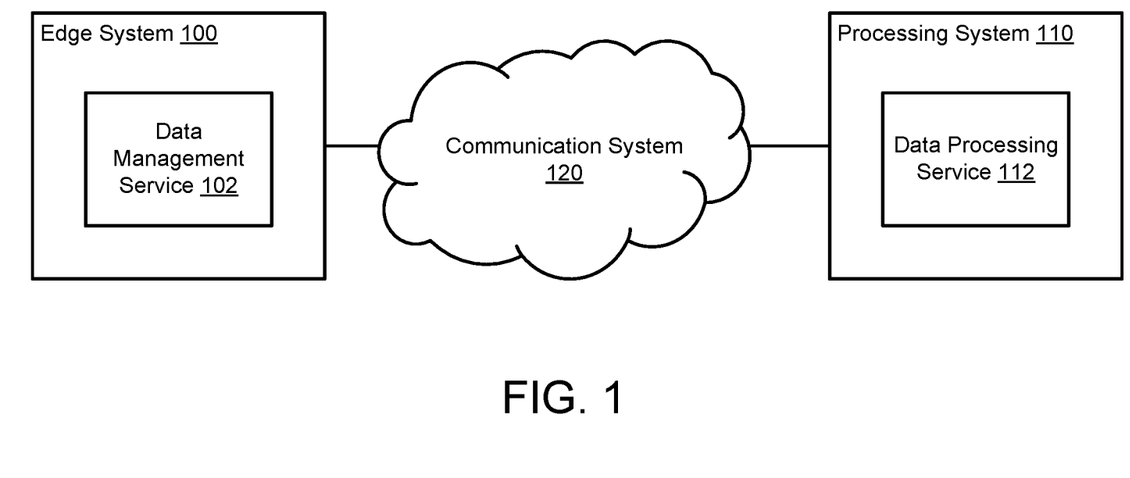
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may collect data and use the collected data in the computer implemented services. To collect data, the system may include any number of edge system 100.

Edge system 100 may collect any type and quantity of information (reflected as stored data). For example, edge system 100 may include sensors and/or other types of components through which information may be obtained and stored as data.

The data collected by edge system 100 may be distributed to processing system 110 (e.g., so that a variety of different types of data from different sources may be used in the computer implemented services). Processing system 110 may collect data from any number of edge systems, and process the collected data. The processing may include, for example, transforming the data, generating visualizations based on the data, etc. Consumers of the data may use the data and/or the processed data.

To collect desired data, edge system 100 may be positioned remotely to processing system 110. For example, edge system 100 may be positioned near sources of data (e.g., a factory, a retail location, etc.) while processing system 110 may be positioned in a data center environment.

To distribute data to processing system 110, edge system 100 may be connected to communication system 120 and/or other types of systems that may facilitate communications between processing system 110 and edge system 100. However, due to the positioning of edge system 100, the operable connection between edge system 100 and communication system 120 may not be reliable.

For example, the bandwidth of the connection may vary over time and/or the connection may sometimes be entirely unavailable. Likewise, the operably connection may be of limited reliability (e.g., some data may be corrupted in transit, may be subject to manipulation by malicious entities, etc.).

Additionally, the data collected by edge system 100 may vary. For example, some types of data collected by edge system 100 be simple name-value pairs, whereas other collected data may be large collections of data such as files.

In general, embodiments disclosed herein may provide methods, systems, and/or devices for managing data collection and processing in distributed systems. To manage the collection and processing of data, a distributed architecture may be used. The architecture may be distributed across edge system 100 and processing system 110. For example, different services may be hosted by these entities.

The hosted services may facilitate collection and processing of data in a manner that is able to adapt to changing network connections (e.g., increasing/reducing communication bandwidth), address reliability challenges, and manage collection of a broad variety of different types of data.

To provide the above noted functionality, the system of FIG. 1 may include any number of edge system 100 and processing system 110. Each of these components is discussed below.

Figure 2:
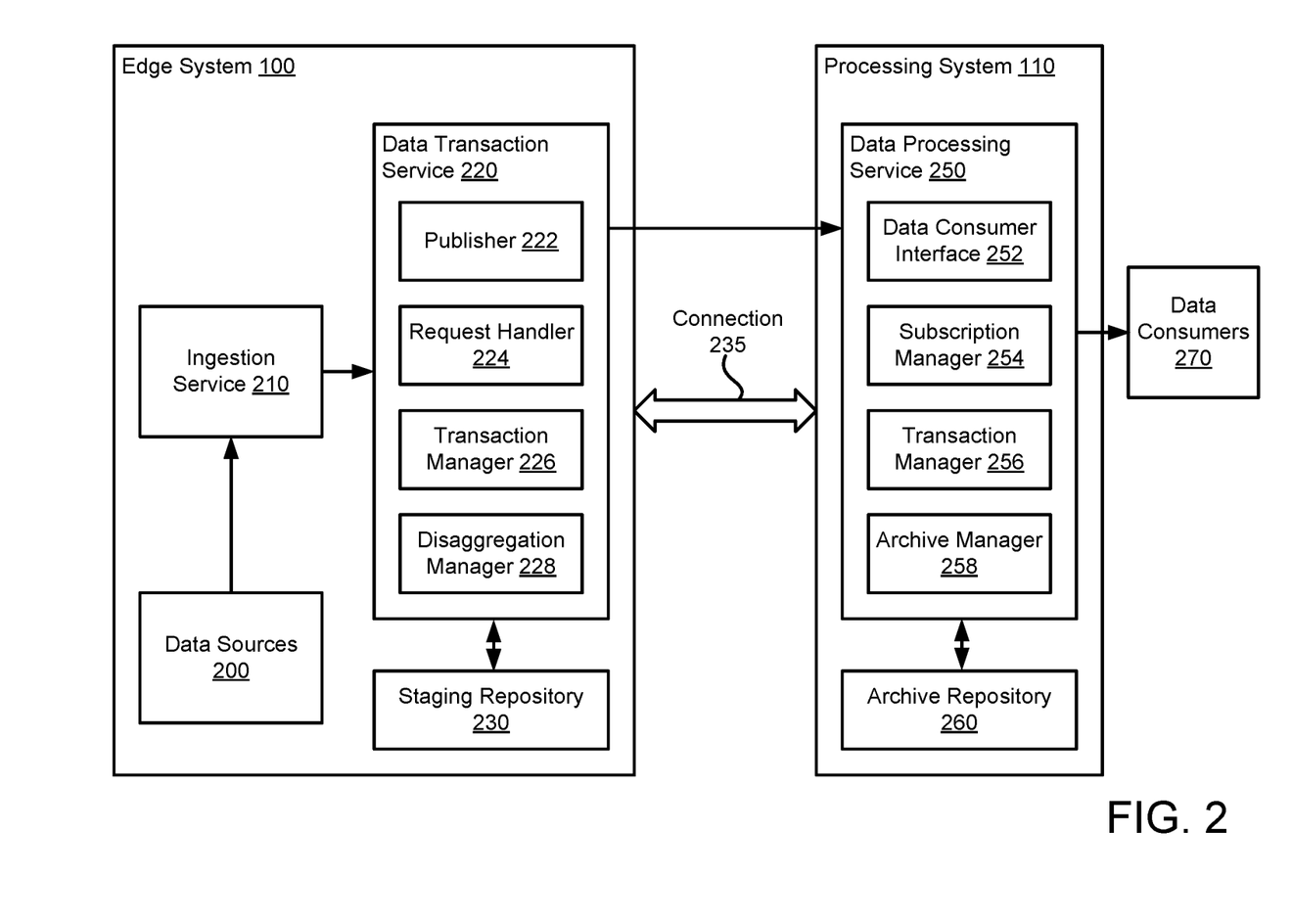
FIG. 2 shows a diagram illustrating a communication architecture in accordance with an embodiment.

Edge system 100, as noted above, may facilitate collection of data. To do so, edge system 100 may (i) obtain data from a data source, (ii) prepare the data for distribution, (iii) classify the prepared data, (iv) select, based on the prepared data, a type of edge side processing to perform, and (v) perform the edge side processing to distribute the prepared data to processing system 110. By adapting how the data is processed, a data pipeline may be established that may efficiently process a broad variety of different types of data. To support the data pipeline, edge system 100 may host data management service 102. Refer to FIG. 2 for additional details regarding data management service 102.

Processing system 110, as noted above, may process data obtaining from edge system 100 and/or other systems. To do so, processing system 110 may (i) obtain information regarding desired data from data consumers, (ii) establish subscriptions for desired data, (iii) communicate the subscription to any number of edge systems to establish data pipelines, and (iv) participate in the data pipelines to aggregated data desired by data consumers. Once aggregated and/or as the data is obtained, the data may be (i) processed to obtain derived data, (ii) archived for use, and/or (iii) provided to data consumers (e.g., and/or along with derived data). To participate in the data pipeline, processing system 110 may host data processing service 112. Refer to FIG. 2 for additional details regarding data processing service 112.

Data management service 102 and data processing service 112 may form a data pipeline that allows for (i) filtering of ingest data, (ii) temporary staging, (iii) data reduction through compression, (iv) real-time data publishing, and (v) transactional multi-part data transmission. To drive the pipeline, data consumers may subscribe to desired data, establish processing modalities for data through the pipeline, and establish archival expectations for data through the pipeline. By doing so, embodiments disclose herein may provide a data source to data consumer solution that addresses environmental challenges such as limitations on communications, reliability, and security.

When providing their functionality, any of (and/or components thereof) edge system 100 and/or processing system 110 may perform all, or a portion, of the methods illustrated in FIGS. 3A-3D.

Any of (and/or components thereof) edge system 100 and processing system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 120. In an embodiment, communication system 120 includes one or more networks that facilitate communication between any number of components. The networks may include wired networks and/or wireless networks (e.g., and/or the Internet). The networks may operate in accordance with any number and types of communication protocols (e.g., such as the internet protocol).

Communication system 120 may also include portable storage devices such as universal serial bus (USB) thumb drives or other types of removable storage devices. The portable storage devices may be used to discrete ferry data between edge system 100 and processing system 110 in scenarios in which edge system 100 is positioned at a dark site that is never operably connected to processing system 110 via a network connection. Thus, communication system 120 may not support persistent communication channels between edge system 100 and processing system 110 in all scenarios.

While illustrated in FIG. 1 as including a limited number of specific components, a system in accordance with an embodiment may include fewer, additional, and/or different components than those components illustrated therein.

As discussed above, the system of FIG. 1 may facilitate data collection and processing using a data pipeline.

Turning to FIG. 2, a data flow diagram in accordance with an embodiment is shown. The data flow diagram may illustrate portions of the data pipeline hosted by edge system 100 and processing system 110.

To participate in the data pipeline, edge system 100 may include data sources 200, ingestion service 210, data transaction service 220, and staging repository 230. Each of these components is discussed below.

Data sources 200 may include any number and type of data source. Data sources 200 may include sensors, other devices, user input devices, and/or other sources of data. Data from data sources 200 may be consumed by ingestion services 210.

Ingestion service 210 may initially process data from data sources 200 to obtain prepared data. Ingestion service 210 may process data as it arrives and asynchronously with other processes. The processing performed by ingestion service 210 may include filtering based on criteria; formatting based on templates, schemas, etc.; aggregating obtained with data from other data sources; and/or other types of processing. The filtering criteria may be any type of criteria such as, for example, quality criteria for the data. The prepared data may be consumed by data transaction service 220.

Data transaction service 220 may process prepared data for distribution to processing system 110. The processing may include (i) classifying the prepared data to identify how to process the data, and (ii) processing the data based on the classification.

The data may be classified based on (i) the type of the prepared data, (ii) the quantity of the prepared data, (iii) a likely consumer of the prepared data, (iv) a criticality of the prepared data (which may be based on the type of the prepared data), and/or other classification criteria.

Based on the data classification, the prepared data may be processed generally by either (i) streaming the data to processing system 110 or (ii) staging the data for future distribution to processing system 110. If staged, the prepared data may be stored in staging repository 230 in accordance with data retention policies. The data retention policies may specify, for example, the duration of time that the prepared data is to be stored prior to deletion. Once staged, the data may be provided to processing system 110 once the data is requested.

To facilitate distribution of prepared data, either through streaming or staging for future distribution, data transaction service 220 may include publisher 222, request handler 224, transaction manager 226, and disaggregation manager 228. Each of these components is discussed below.

Publisher 222 may distribute information regarding types of data available from data management service 102. For example, publisher 222 may provide processing system 110 with information regarding the types of data that may be provided by edge system 100.

Request handler 224 may process requests for data from processing system 110. To process the requests, request handler 224 may cooperate with transaction manager 226 and disaggregation manager 228. For example, when a request for data is received, request handler 224 may (i) identify the data in staging repository 230, (ii) request that transaction manager 226 establish a correlation identifier for a transaction through which the requested data will be provided to processing system, and (iii) initiate distribution of the data by disaggregation manager 228.

Transaction manager 226 may manage transactions by establishing correlation identifiers for transactions. The correlation identifiers may be identifiers used to manage distribution of data from edge system 100. The correlation identifiers may be provided along with data as it is distributed by edge system 100 so that receiving systems such as processing system 110 may identify how the data relates to previously received data. As will be discussed below, for large portions of data, disaggregation manager 228 may divide data into sub-portions for distribution. A common correlation identifier may be used to associate the sub-portions of the data with one another.

Disaggregation manager 228 may, as noted above, manage division of data into portions for distribution. Disaggregation manager 228 may divide data based on criteria. The criteria may be based on how edge system 100 communicates with processing system 110. For example, the criteria may be based on a size of a data unit that may be transmitted between edge system 100 and processing system 110 to improve communication efficiency. Basing the size of each portion of data on this criteria may reduce the quantity of metadata and/or other overhead for transmitting the data from edge system 100 to processing system 110.

Staging repository 230 may be implemented using one or more data structures in which data may be stored in accordance with retention policies. When stored in staging repository 230, the data may be compressed and/or subjected to various data minimization procedures. Consequently, when distributed, the size-minimized data may be more efficiently distributed.

To facilitate distribution of data, edge system 100 may be connected to processing system via connection 235. Connection 235 may be a secure connection that utilizes mutual transport layer security and/or other security protocols. Connection 235 may also utilize port forwarding so that only a single port is used to distribute data from edge system 100 to processing system 110, regardless of the type of data being distributed and/or origin of the distributed data.

To participate in the data pipelined, processing system 110 may include data processing service 250 and archive repository 260. Each of these components is discussed below.

Data processing service 250 may acquire and process data from edge system 100 on behalf of any number of data consumers 270. While illustrated as being separate from processing system 110, it will be appreciated that some of data consumers 270 may be hosted by processing system 110. To acquire and process data, data processing service 250 may (i) maintain and use information regarding data available from edge system 100 as advertised by publisher 222, (ii) identify data of interest to data consumers 270, (iii) establish subscriptions for the data and actively acquire the data from edge system 100, (iv) process and/or otherwise use the data to obtain new/different data requested by data consumers 270, (v) provide the data/derived data to data consumers 270, and/or (vi) archive data for future use.

To facilitate acquisition and use of data from edge system 100, data processing service 250 may include data consumer interface 252, subscription manager 254, transaction manager 256, and archive manager 258. Each of these components is discussed below.

Data consumer interface 252 may enable data consumers 270 to express interest in data available from edge system 100 and/or other data that may be obtained using the data available from edge system 100. For example, data consumer interface 252 may be implemented using an application programming interface through which (i) information regarding data available from edge system 100 may be obtained, and (ii) requests for the data may be made. When a request for data is made, information regarding the request may be retained for use and distributed to data transaction service 220 (e.g., request handler 224) so that edge system 100 may initiate distribution of data to fulfill the expressed desire for data.

Subscription manager 254 may manage distribution of data to data consumers 270 based on subscriptions. When a data consumer expresses a desire for data, subscription manager 254 may store information regarding the desire as a subscription. When data is obtained by processing system 110, the subscriptions may be checked to ascertain to which data consumers 270 the data should be distributed. Once identified, subscription manager 254 may distribute the data to the corresponding data consumers 270. When doing so, subscription manager 254 may cooperate with transaction manager 256, discussed below.

Transaction manager 256 may manage transactions initiated by edge system 100. Specifically, transaction manager 256 may retain correlation identifiers for data, and use the correlation identifiers to manage data received from edge system 100 to ascertain whether all portions of data for a particular transaction have been received.

For example, as portions of data are received, transaction manager 256 may check the correlation identifiers against correlation identifiers of transactions to check in data against transactions as the portions of data are received. A check sum, portion list, a confirmation from transaction manager 226, and/or other data structure may be checked to ascertain whether all of the portions for a particular transaction have been received and/or are expected to have been received. Once all have been received, then transaction manager 256 may notify subscription manager 254 that the data associated with a particular transaction is available for distribution to data consumers 270.

If any portions of data for a transaction are not received as expected, transaction manager 256 may cooperate with transaction manager 226 to attempt to remediate the situation. For example, transaction manager 256 may initiate resending of missing portions of data.

Archive manager 258 may automatically archive select data as it is obtained. Archive manager 258 may archive data in accordance with archive policies. The archive policies may define under what conditions obtained data is at least temporarily stored in archive repository 260.

Archive repository 260 may be implemented using one or more data structures in which data may be stored in accordance with archive policies. When stored in archive repository 260, the data may be compressed and/or subjected to various data minimization procedures.

Any of the active components (e.g., 200-228, 250-258) may be implemented using hardware and/or software components. For example, any of the active components may be implemented using software instructions executed by processing devices. Similarly, any of the active components may be implemented using special purposes and/or programmable hardware devices such as application specific integrated circuits, digital signal processors, etc.

As discussed above, the components of FIG. 1 may perform various methods to manage storage, distribution, and use of data from data sources. FIGS. 3A-3D illustrate methods that may be performed by the components of the system of FIG. 1. In the diagrams discussed below and shown in FIGS. 3A-3D, any of the operations may be repeated, performed in different orders, and/or performed in parallel with or in a partially overlapping in time manner with other operations.

Figure 3A:
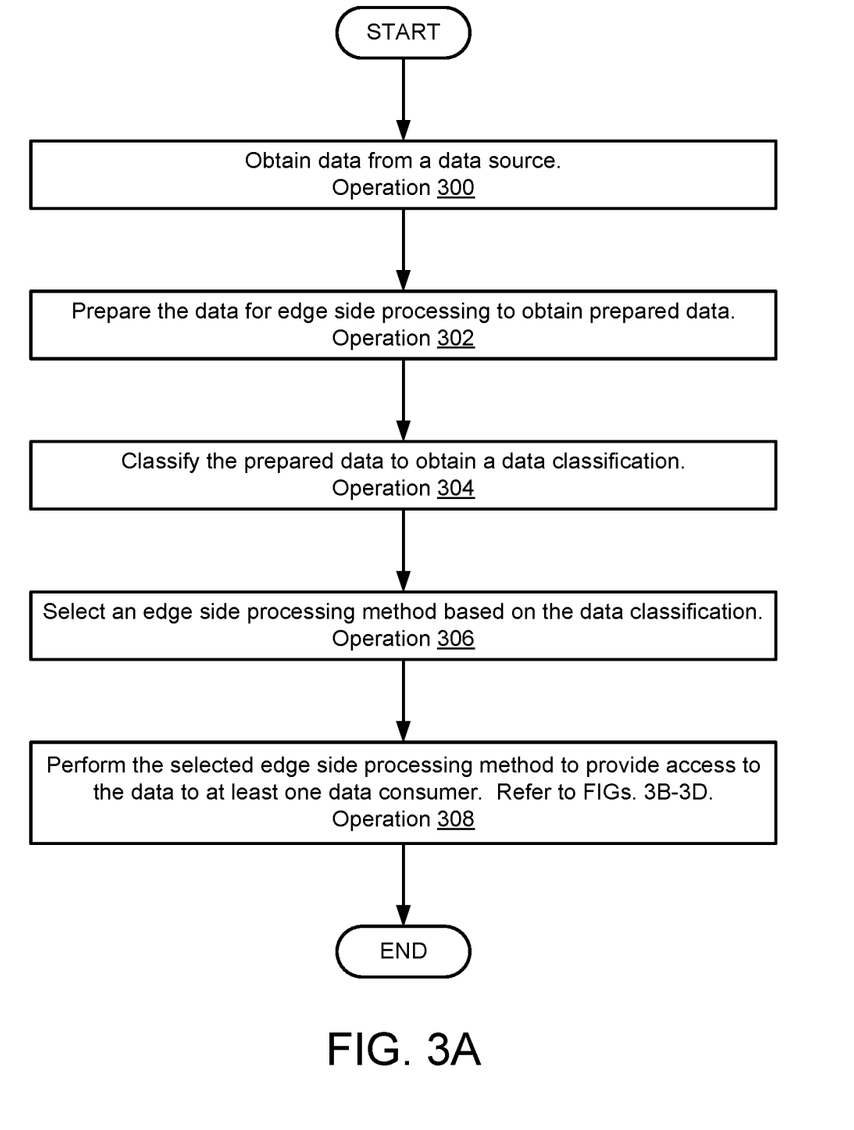
FIGS. 3A-3D show flow diagrams illustrating methods in accordance with an embodiment.

Turning to FIG. 3A, a flow diagram illustrating a method for managing data in accordance with an embodiment is shown. The method may be performed by any of edge system 100, processing system 110, and/or other components of the system shown in FIG. 1.

At operation 300, data is obtained from a data source. The data may be obtained by receiving it from the data source. The data may be obtained by an edge system.

At operation 302, the data is prepared for edge side processing to obtain prepared data. The data may be prepared by filtering the data, formatting the data, aggregating the data with other data, and/or performing other types of processing of the data.

The data may be filtered based on filtering criteria. The filtering criteria may be any type and quantity of criteria. For example, the filtering criteria may be used to identify and exclude irrelevant or extraneous information, to enforce privacy frameworks through elimination of personal information, etc.

The data may be formatted by applying a schema and/or template (and/or using the data to populate a template). For example, a template may be used to sorts or otherwise arranges the data in a predetermined manner as will be expected by a data consumer or other entity.

The data may be aggregated with other data by populating a template with data from multiple data sources, and/or with derived data. The data may be aggregated with other data via other methods.

At operation 304, the prepared data is classified to obtain a data classification. The data may be classified by (i) identifying characteristics of the data and (ii) applying a set of classification rules to the characteristics. The characteristics may include a type of the data, a criticality of the data, a quantity of the data, and/or other characteristics.

The type of the data may relate to a source of the data, a format of the data, the information content of the data, typical uses for the data, and/or other types of information regarding the data.

In an embodiment, the data is classified into one of four types: (i) streaming data, (ii) real-time data, (iii) critical events, and (iv) archive data. Streaming data may be low-volume telemetry data, such as CPU usage, disk usage, and similar data. Real-time data may be time-critical and low volume dynamic data. Critical events may be error notifications or other types of system notifications regarding its operation. Archive data may be log data, core dumps, images, and/or other large file-based data.

At operation 306, an edge side processing method is selected based on the data classification. Each edge side processing method may be associated with one or more data classifications. The data classification for data may be used as a key to lookup the edge side processing method (e.g., if stored in a lookup data structure).

At operation 308, the selected edge side processing method is performed to provide access to the data to at least one data consumer. The edge side processing method may be performed via the methods shown in FIGS. 3B-3D.

Figure 3B:
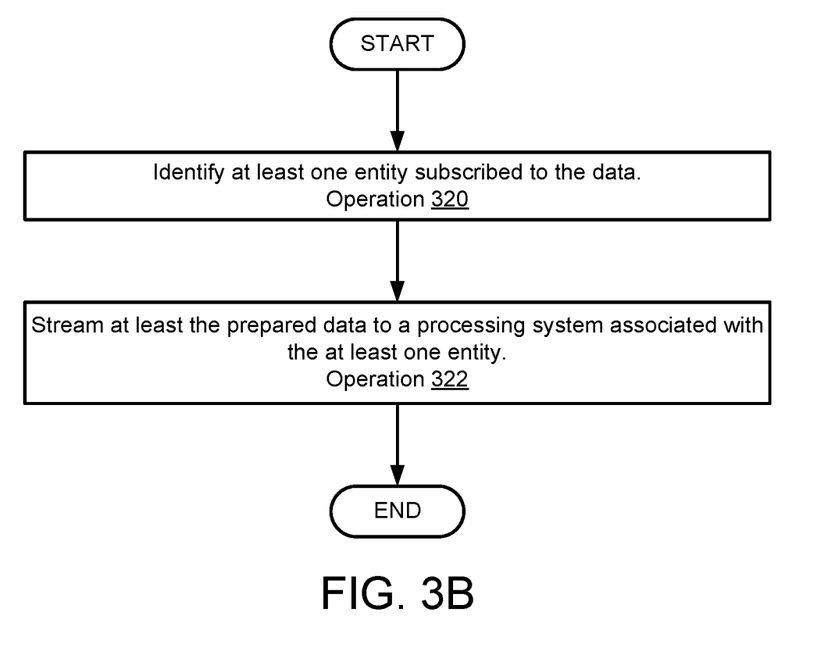

In an embodiment, the edge side processing method illustrated in FIG. 3B is performed when the data classification is any of streaming data, real-time data, and critical events.

Figure 3C:
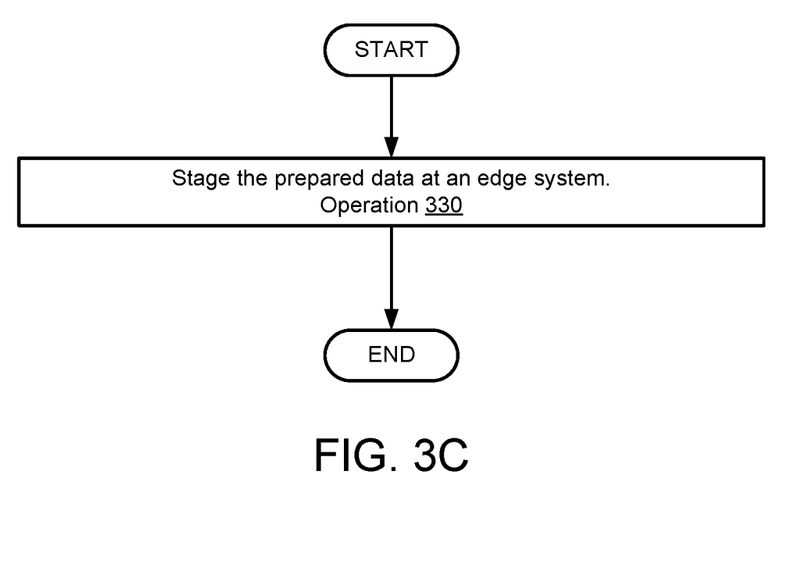
Figure 3D:
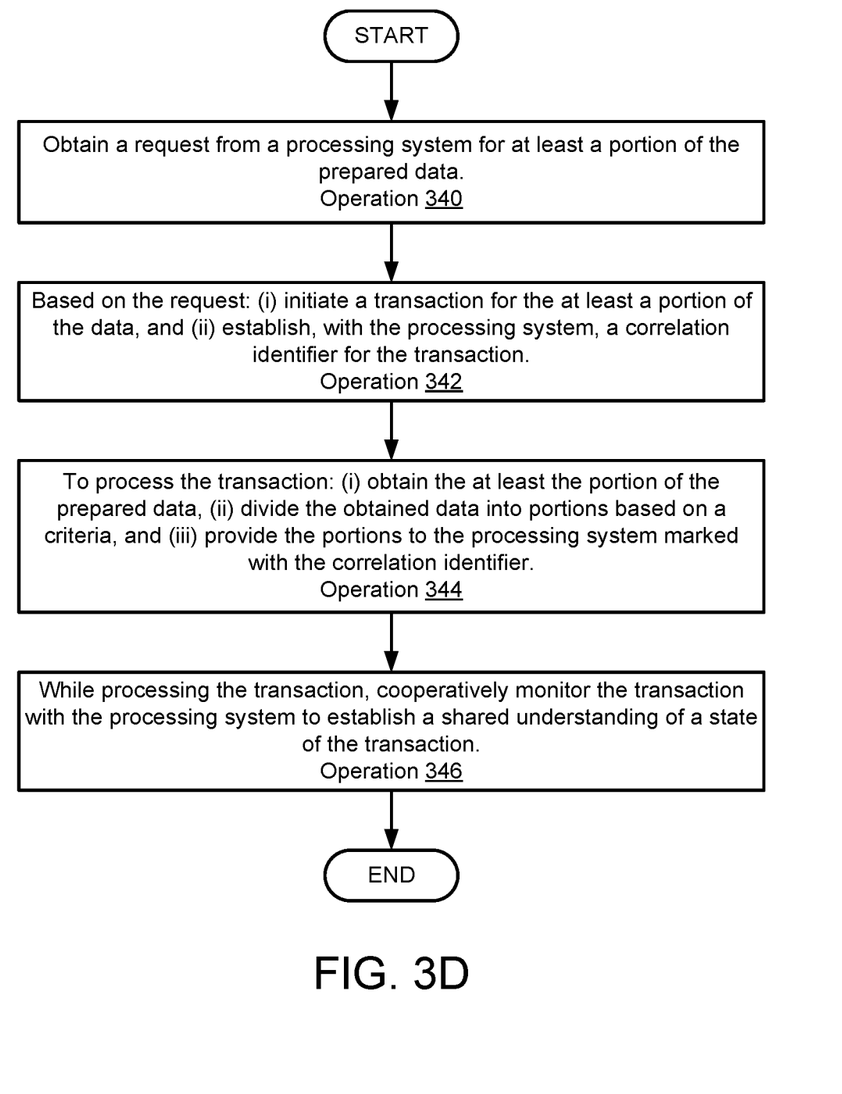

In an embodiment, the edge side processing method illustrated in FIGS. 3C-3D is performed when the data classification is archive data.

The method may end following operation 308.

Turning to FIG. 3B, a flow diagram illustrating a method for performing edge side processing in accordance with an embodiment is shown. The method may be performed by any of edge system 100, processing system 110, and/or other components of the system shown in FIG. 1.

At operation 320, at least one entity subscribed to the data is identified. The entity may be identified checking previously received subscriptions from a processing system.

At operation 322, at least the prepared data is streamed to a processing system associated with the at least one entity. The data may be streamed by, after being prepared, analyzed by publisher 222, and sent to subscription manager 254 of processing system 110 via connection 235. When received by subscription manager 254, the at least one entity may be identified and provided the prepared data.

Additionally, a copy of the prepared data may also be stored in archive repository if a relevant archive policy is in place.

Further, the prepared data may also be ingested into visualization tools or other entities hosted by the processing system. For example, in the context of telemetry data, graphical representations of changes in the telemetry data over time may be generated and displayed via the visualization tools. Other types of subsequent process using the prepared data may be performed to improve the utility of the prepared data.

The method may end following operation 322.

Using the method illustrated in FIG. 3B, data that may be of high importance for management purposes may be automatically streamed to a processing system for further analysis without delay.

Turning to FIG. 3C, a flow diagram illustrating a method for performing edge side processing in accordance with an embodiment is shown. The method may be performed by any of edge system 100, processing system 110, and/or other components of the system shown in FIG. 1.

At operation 330, the prepared data is staged at an edge system. The prepared data may be staged by storing it in staging repository 230. When so staged, the data may be minimized and/or otherwise processed to reduce the size of the prepared data.

Additionally, various metadata may be added to the prepared data to facilitate efficient distribution. The metadata may include, for example, correlation identifiers.

Further, the prepared data may be pre-divided into portions or other logical units to facilitate multipart transactions.

The method may end following operation 330.

Following operating 330, a request for the data may be issued by a processing system, a queued request for the data may be processed (e.g., due to unavailability of communications with the processing system), and/or other events may occur impacting the now-staged data in the edge system.

Turning to FIG. 3D, a flow diagram illustrating a method for performing edge side processing in accordance with an embodiment is shown. The method may be performed by any of edge system 100, processing system 110, and/or other components of the system shown in FIG. 1.

At operation 340, a request from a processing system for at least a portion of the prepared data may be obtained. The request may be obtained by receiving it, by reading the request from storage, and/or via other methods. The at least the portion of the prepared data may be staged for distribution.

At operation 342, based on the request, a transaction for the at least the portion of the data may be initiated. A correlation identifier for the transaction may also be established with the processing system.

The transaction may be initiated by (i) notifying the processing system of the transaction, and (ii) initiating generation of the correlation identifier. The processing system may be notified of the transaction via a message indicating initiation of the transaction.

The correlation identifier may be established by (i) generating the correlation identifier, and (ii) notifying the processing system of the correlation identifier. The correlation identifier may be a globally unique identifier, or another type of identifier.

At operation 344, the transaction may be processed. The transaction may be processed by (i) obtaining the at least the portion of the prepared data, (ii) dividing the prepared data into portions (if not already divided), and/or (iii) providing the portion of the prepared data to the processing system. The portion of the prepared data may be provided to the processing system along with copies of the correlation identifier to mark that each of the portion of the prepared data are part of the transaction.

At operation 346, the transaction is cooperatively monitored with the processing system to establish a shared understanding of a state of the transaction while the transaction is processed. The transaction may be cooperatively monitored by (i) providing the processing system with information regarding the transmitted portion of the prepared data, and (ii) obtaining an acknowledgement of or error regarding the portions of the prepared data. An acknowledgement may indicate receipt, by the processing system, of the portions of the prepared data. An error may indicate that a portion of the prepared data was not received.

If an error is received, the edge system may take action to remedy the error. For example, the edge system may resend another copy of the portion of the prepared data marked as being in error.

Once acknowledgement of all of the portions of the prepared data is received, a shared understanding of successful completion of the transaction may be obtained by both systems.

The method may end following operation 346.

After the prepared data is obtained by the processing system, either through streaming or transaction, the prepared data may be used to service data consumers. For example, the prepared data may be supplied to the data consumers, some or all of the prepared data may be archived for future use, data reduction modalities may be reversed (e.g., if needed to fully utilize the prepared data), derived data such as visualization, graphics, new data, etc. may be generated, and/or other activity may be performed on the processing system side.

Thus, using the methods illustrated in FIGS. 3A-3D, embodiments disclosed herein may facilitate collection and use of data of a variety of different types and under a variety of different conditions. To manage responses to these conditions, data obtained by edge systems may be queued and/or otherwise retained for eventual processing as part of the pipeline, as communications with the processing system are available.

To further improve the utility and security of the system, each end of the data pipeline may utilize security measures include, for example, encryption and signing to reduce the susceptibility to tampering. For example, when portions of data as part of a transaction are sent to a processing system, the data may be encrypted and/or signed such that the processing system may verify the authenticity of the data and the likelihood of the data being snooped or otherwise read by unauthorized entities may be reduced. These security measures may be employed at the data transaction service 220 and data processing service 250 level. Consequently, an additional layer of security beyond that offered by connection 235 may also be employed.

Figure 4:
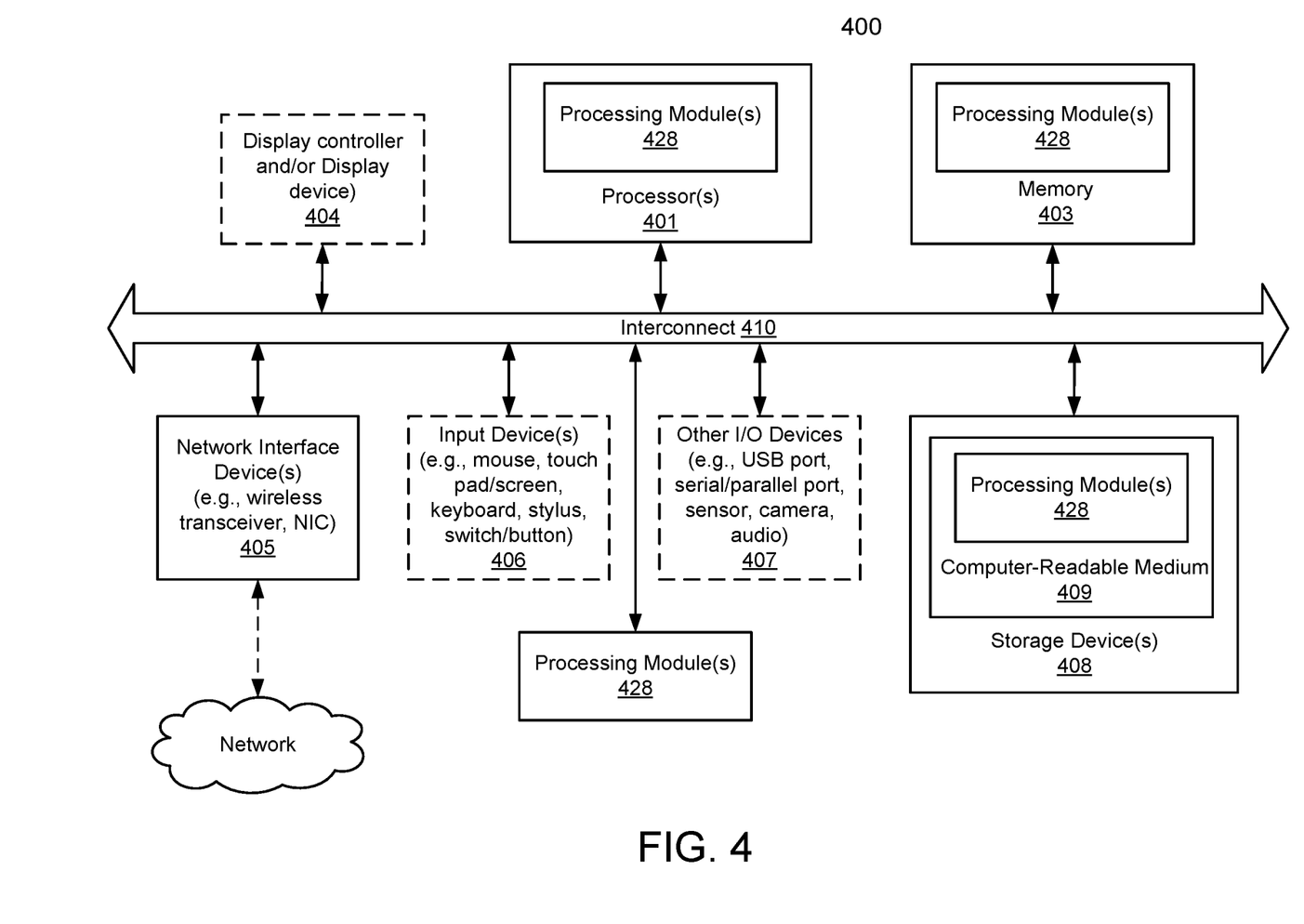
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing distributed processing of data, the method comprising:
    by an edge system configured to perform the method as part of an edge side processing service:
        obtaining the data from a data source;
        preparing the data for edge side processing to obtain prepared data;
        classifying the prepared data to obtain a data classification;
        selecting an edge side processing method based on the data classification; and
        performing the selected edge side processing method to provide access to the prepared data to at least one data consumer, and a secure connection utilizing at least mutual transport layer security (Mutual TLS) being used during the selected edge side processing method to distribute the prepared data.

2. The method of claim 1, wherein preparing the data comprises formatting the data based on a formatting template.

3. The method of claim 1, wherein classifying the prepared data comprises:
    identifying a type of the data;
    identifying a criticality of the data; and
    using the type and the criticality to classify the prepared data.

4. The method of claim 1, wherein the edge side processing method comprises performing an immediate forwarding of the prepared data.

5. The method of claim 4, wherein performing the immediate forwarding comprises streaming the prepared data to a processing system associated with the at least one data consumer.

6. The method of claim 1,
    wherein the edge side processing method comprises performing a staging for future forwarding, and
    performing the staging for future forwarding further comprises, at least, establishing a correlation identifier during a transaction associated with at least a portion of the prepared data, the correlation identifier being usable by both the edge system and a processing system associated with the at least one data consumer.

7. The method of claim 1,
    wherein the edge side processing method comprises performing a staging for future forwarding;
    performing the staging for future forwarding comprises, at least:
        temporarily storing the prepared data in the edge system in a size-minimized form;
        obtaining, after the temporary storing of the prepared data and from a processing system associated with the at least one data consumer, a request for the prepared data; and
        providing, in response to the request, the prepared data in the size-minimized form to the processing system.

8. The method of claim 1,
    wherein the edge side processing method comprises performing a staging for future forwarding, and
    performing the staging for future forwarding comprises, at least:
        obtaining a request for at least a portion of the prepared data;
        processing the request to provide the at least the portion of the prepared data to the at least one data consumer; and
        cooperatively monitoring the processing of the request with a processing system associated with the at least one data consumer to establish a shared understanding of a state of the request with the processing system.

9. The method of claim 8, wherein performing the staging for future forwarding further comprises:
    dividing the at least the portion of the prepared data based on a criteria to obtain data portions; and
    providing the data portions to the processing system with a correlation identifier usable by both the edge system and the processing system to facilitate the cooperative monitoring of the processing of the transaction.

10. The method of claim 1, wherein a port forwarding schema utilizing only a single port is further used in addition to the secure connection utilizing Mutual TLS to distribute the prepared data to the at least one data consumer, the port forwarding schema being utilized while ignoring a type and an origin of the distributed data.

11. A non-transitory machine-readable medium having instructions stored therein, which when executed by at least one processor, cause an edge system to perform operations for managing distributed processing of data, the operations comprising:
    obtaining the data from a data source, the operations being part of an edge side processing service performed by the edge system;
    preparing the data for edge side processing to obtain prepared data;
    classifying the prepared data to obtain a data classification;

selecting an edge side processing method based on the data classification; and performing the selected edge side processing method to provide access to the data to at least one data consumer, and a secure connection utilizing at least mutual transport layer security (Mutual TLS) being used during the selected edge side processing method to distribute the prepared data.

12. The non-transitory machine-readable medium of claim 11, wherein preparing the data comprises at least one action selected from a group of actions consisting of:

filtering the data using a filtering criteria;

formatting the data based on a formatting template; and aggregating the data with other data relevant to the at least one data consumer.

13. The non-transitory machine-readable medium of claim 11, wherein classifying the prepared data comprises:

identifying a criticality of the data;

identifying a quantity of the data; and using the criticality and the quantity to classify the prepared data.

14. The non-transitory machine-readable medium of claim 11, wherein the edge side processing method is selected from a group of edge side processing methods consisting of:

immediate forwarding; and staging for future forwarding.

15. The non-transitory machine-readable medium of claim 14, wherein in an instance of the selecting where the edge side processing method comprises the immediate forwarding, performing the selected edge side processing method comprises:

streaming the prepared data to a processing system associated with the at least one data consumer.

16. The non-transitory machine-readable medium of claim 15, wherein in an instance of the selecting where the edge side processing method comprises the staging for future forwarding, performing the selected edge side processing method comprises:

temporarily storing the prepared data in the edge system based on a retention policy for the data.

17. The non-transitory machine-readable medium of claim 16, wherein in the instance of the selecting where the edge side processing method comprises the staging for future forwarding, performing the selected edge side processing method further comprises:

after temporarily storing the prepared data:

obtaining a request from the processing system for at least a portion of the prepared data;

based on the request:

initiating a transaction for the at least the portion of the prepared data; and establishing a correlation identifier for the transaction usable by both the edge system and the processing system.

18. The non-transitory machine-readable medium of claim 17, wherein in the instance of the selecting where the edge side processing method comprises the staging for future forwarding, performing the selected edge side processing method further comprises:

processing the transaction to provide the at least the portion of the prepared data to the at least one data consumer; and cooperatively monitoring the processing of the transaction to establish a shared understanding of a state of the transaction with the processing system.

19. The non-transitory machine-readable medium of claim 18, wherein processing the transaction comprises:

dividing the at least the portion of the prepared data based on a criteria to obtain data portions; and providing the data portions to the processing system along with the correlation identifier to facilitate the cooperative monitoring of the processing of the transaction.

20. An edge system, comprising:

at least one processor; and a memory coupled to the processor to store instructions, which when executed by the processor, cause the edge system to perform operations for managing distributed processing of data, the operations being part of an edge side processing service performed by the edge system and comprising:

obtaining the data from a data source;

preparing the data for edge side processing to obtain prepared data;

classifying the prepared data to obtain a data classification;

selecting an edge side processing method based on the data classification; and performing the selected edge side processing method to provide access to the data to at least one data consumer, and a secure connection utilizing at least mutual transport layer security (Mutual TLS) being used during the selected edge side processing method to distribute the prepared data.

* * * * *